US012725124B2

(12) United States Patent
Undernehr et al.

(10) Patent No.: US 12,725,124 B2
(45) **Date of Patent: *Sep. 1, 2026**

(54) INVENTORY INFORMATION DISTRIBUTION SYSTEMS, DEVICES AND METHODS

(71) Applicant: Walmart Apollo, LLC, Bentonville, AR (US)

(72) Inventors: Christopher L. Undernehr, Bentonville, AR (US); Tushar Agrawal, Bentonville, AR (US); Sandesh N. Ramnathkar, Bentonville, AR (US); John Turknett, Centerton, AR (US); Mohandas N. Vonga, O'Fallon, MO (US); Matthew S. Woitaszek, San Bruno, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 199 days.

This patent is subject to a terminal disclaimer.

(21) Appl. No.: 18/101,886

(22) Filed: Jan. 26, 2023

(65) Prior Publication Data

US 2023/0169463 A1 Jun. 1, 2023

Related U.S. Application Data

(63) Continuation of application No. 16/938,359, filed on Jul. 24, 2020, now Pat. No. 11,593,759, which is a (Continued)

(51) Int. Cl.
*G06Q 10/0875* (2023.01)
*G06F 8/65* (2018.01)
(Continued)

(52) U.S. Cl.
CPC .......... *G06Q 10/0875* (2013.01); *G06F 8/65* (2013.01); *G06Q 10/087* (2013.01); (Continued)

(58) Field of Classification Search
CPC ............ G06Q 10/0875; G06Q 10/087; G06Q 10/107; G06Q 30/0639; G06F 8/65; G07F 5/18; G07F 9/026
See application file for complete search history.

(56) References Cited

U.S. PATENT DOCUMENTS 4,707,831 A 11/1987 Weir
5,608,643 A 3/1997 Wichter
(Continued)

FOREIGN PATENT DOCUMENTS

EP 2112619 B1 10/2009

OTHER PUBLICATIONS

Feist, "Integration Patterns: Content-based Routing", 2011, https://blogs.mulesoft.com/api-integration/patterns/integration-patterns-content-based-routing/ (Year: 2011).*
(Continued)

*Primary Examiner* — Allen C Chein
(74) *Attorney, Agent, or Firm* — Fitch, Even, Tabin & Flannery LLP

(57) ABSTRACT

Some embodiments provide a product inventory information distribution apparatus, comprising: a central electronic data storage buffer; a control circuit; and a memory storing computer instructions that when executed cause the control circuit to: detect product inventory update information messages, wherein each of the product inventory update information messages is received from one of multiple different product inventory systems and is generated by a corresponding one of the multiple product inventory systems when one of the multiple product inventory systems detects a change
(Continued)

in an inventory state corresponding to any one of hundreds or more products available through the product inventory storage facility; direct each of the multiple product inventory update information messages to the central electronic data storage buffer; and maintain messages in the central electronic data storage buffer received during a buffer retention window of time.

20 Claims, 2 Drawing Sheets

Related U.S. Application Data continuation of application No. 15/568,207, filed as application No. PCT/US2016/028067 on Apr. 18, 2016, now Pat. No. 10,726,389.

(60) Provisional application No. 62/150,755, filed on Apr. 21, 2015.

(51) Int. Cl.

*G06Q 10/087* (2023.01)
*G06Q 10/107* (2023.01)
*G06Q 30/0601* (2023.01)
*G07F 5/18* (2006.01)
*G07F 9/02* (2006.01)

(52) U.S. Cl.

CPC ....... *G06Q 10/107* (2013.01); *G06Q 30/0639* (2013.01); *G07F 5/18* (2013.01); *G07F 9/026* (2013.01)

(56) References Cited

U.S. PATENT DOCUMENTS

| | | | | |
|---|---|---|---|---|
| 5,946,679 | A * | 8/1999 | Ahuja | G06F 16/9014 |
| 5,948,069 | A | 9/1999 | Kitai | |
| 6,401,076 | B1 | 6/2002 | Hall | |
| 7,252,230 | B1 | 8/2007 | Sheikh | |
| 7,475,024 | B1 | 1/2009 | Phan | |
| 7,574,383 | B1 * | 8/2009 | Parasnis | G06Q 10/087<br>705/28 |
| 7,801,863 | B2 * | 9/2010 | Brown | G06Q 10/10<br>707/663 |
| 7,890,955 | B2 | 2/2011 | Paramasivam | |
| 7,953,571 | B2 * | 5/2011 | Odaka | H04L 41/06<br>702/182 |
| 7,979,530 | B1 | 7/2011 | Lee | |
| 8,645,248 | B2 * | 2/2014 | Roselli | G06Q 10/10<br>715/253 |
| 10,726,389 | B2 | 7/2020 | Undernehr | |
| 11,593,759 | B2 | 2/2023 | Undernehr | |
| 2003/0227392 | A1 | 12/2003 | Ebert | |
| 2004/0249728 | A1 | 12/2004 | Wu | |
| 2006/0100937 | A1 | 5/2006 | Lucas | |
| 2006/0271600 | A1 * | 11/2006 | Goh | G06F 16/275 |
| 2007/0239568 | A1 | 10/2007 | Conley | |
| 2009/0243856 | A1 * | 10/2009 | Lee | G06Q 10/087<br>340/572.1 |
| 2009/0278937 | A1 | 11/2009 | Botchen | |
| 2010/0145864 | A1 | 6/2010 | Boesjes | |
| 2013/0013351 | A1 | 1/2013 | Cholak | |
| 2013/0151381 | A1 | 6/2013 | Klein | |
| 2013/0332291 | A1 | 12/2013 | Perez | |
| 2014/0249947 | A1 | 9/2014 | Hicks | |
| 2018/0300680 | A1 | 10/2018 | Undernehr | |
| 2020/0356948 | A1 | 11/2020 | Undernehr | |

OTHER PUBLICATIONS

MariaDB, Database Master-Slave Replication in the Cloud, 2013, https://mariadb.com/resources/blog/database-master-slave-replication-in-the-cloud/ (Year: 2013).*

Ahmad Salim, "SQL Server 2005—Merge Replication Step by Step Procedure", Aug. 2008, available at https://www.codeproject.com/Articles/28951/SQL-Server-2005-Merge-Replication-Step-by-Step-Pro?display=Print (Year:2008).

Main Retail; "Point of Sale Software for Retail Stores" ; https://web.archive.org/web/20150222032722/http://www.mainretail.com/benefits.html; Feb. 22, 2015; pp. 1-5.

Mathias Meyer, "The Simple Magic of Consistent Hashing", Dec. 2011, https://www.paperplanes.de/2011/12/9. the-magic-of-consistent-hashing.html (Year: 2011).

Oliver, "A Survey of Mobile Database Caching Strategies", 2007, http://citeseerx.ist.psu.edu/viewdoc/download?doi=10.1.1.646.6036&rep=rep1&type=pdf (Year: 2007).

PCT; App. No. PCT/US2016/028067; International Search Report and Written Opinion mailed Jul. 15, 2016.

Symantec, "How Long Should Email be Saved?", 2007, http://users.umiacs.umd.edu/~oard/teaching/708x/spring09/11.pdf (Year: 2007).

USPTO; U.S. Appl. No. 15/568,207; Office Action mailed Dec. 3, 2019.

USPTO; U.S. Appl. No. 16/938,359; Non-Final Rejection mailed May 13, 2022; (pp. 1-22).

USPTO; U.S. Appl. No. 16/938,359; Notice of Allowance and Fees Due (PTOL-85) mailed Oct. 24, 2022; (pp. 1-8).

USPTO; U.S. Appl. No. 15/568,207; Notice of Allowance mailed Mar. 23, 2020.

* cited by examiner

INVENTORY INFORMATION DISTRIBUTION SYSTEMS, DEVICES AND METHODS

RELATED APPLICATION

This application is a continuation of U.S. application Ser. No. 16/938,359, filed Jul. 24, 2020, and entitled INVENTORY INFORMATION DISTRIBUTION SYSTEMS, DEVICES AND METHODS, which is a continuation of U.S. application Ser. No. 15/568,207, filed Oct. 20, 2017, and entitled INVENTORY INFORMATION DISTRIBUTION SYSTEMS, DEVICES AND METHODS, now U.S. Pat. No. 10,726,389, which claims priority to International Application No. PCT/US2016/028067, filed Apr. 18, 2016, and entitled INVENTORY INFORMATION DISTRIBUTION SYSTEMS, DEVICES AND METHODS, which claims the benefit of U.S. Provisional Application No. 62/150,755, filed Apr. 21, 2015, and entitled INVENTORY INFORMATION DISTRIBUTION SYSTEMS, DEVICES AND METHODS, each of which is incorporated by reference in its entirety herein.

TECHNICAL FIELD

These teachings relate generally to shopping environments and more particularly to devices, systems and methods for assisting customers and/or workers in those shopping environments.

BACKGROUND

In the modern retail industry, there is a need to improve the customer experience and/or convenience for the customer. Customers have numerous different retail options, including "brick and mortar" retailers, catalog retailers, online retails, other such retail options, and many retailers that provide a combination of two or more of such retail options. Customers have potentially more retail options that ever before.

As such, the customer experience is critical to retail success. Such experience can dictate whether a customer continues to purchase from a retailer.

BRIEF DESCRIPTION OF THE DRAWINGS

The above needs are at least partially met through provision of embodiments of systems, devices, and methods designed to provide assistance to customers and/or workers in a shopping facility, such as described in the following detailed description, particularly when studied in conjunction with the drawings, wherein.

Figure 1:
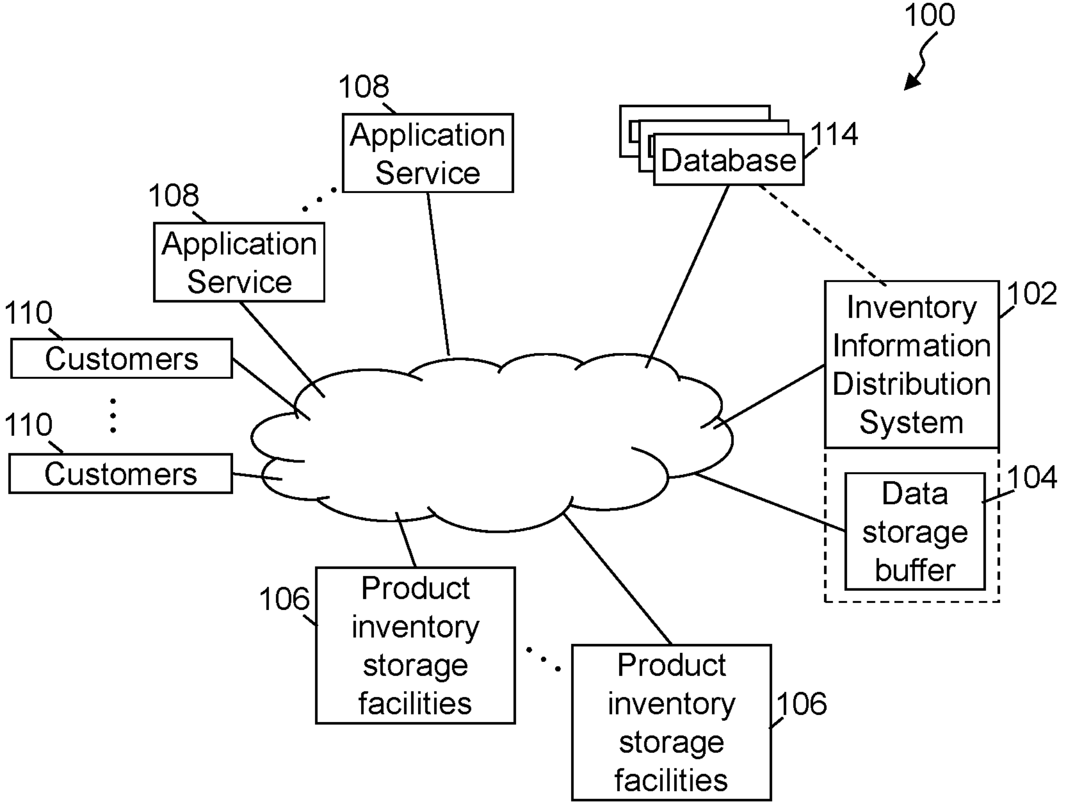
FIG. 1 illustrates embodiments of an exemplary system that allows product inventory information to be distributed to one or more application services, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems, devices and methods are provided that rapidly distribute in real time product inventory information of multiple product inventory storage facilities that maintain an inventory of one or more products and offer the one or more products for distribution and/or sale. In some embodiments, the distribution of product inventory information is an automatic distribution that is pushed out to one or more application services so that the one or more application services can have accurate inventory information that is the same as the inventory information of the product inventory storage facilities. This allows the application services to provide customers with accurate and real time information about one or more products available through the one or more product inventory storage facilities.

Accordingly, some embodiments receive and buffer in real time product inventory update information messages from numerous different product inventory storage facilities and automatically and immediately cause each of the product inventory update information messages to be streamed or otherwise pushed from a data storage buffer over a distributed communication network to each of multiple different application services. The application services are configured to use the inventory update information to compile an inventory state that duplicates the inventory state at the one or more product inventory storage facilities. As such, the application services can maintain inventory information for each of the product inventory storage facilities that is substantially identical to the inventory information at each of the product inventory storage facilities.

Referring now to the drawings, FIG. 1 illustrates embodiments of an exemplary system 100 that allows product inventory information to be distributed to one or more application services 108, in accordance with some embodiments, that can serve to carry out at least some of the teachings set forth herein. It will be understood that the details of this example are intended to serve in an illustrative capacity and are not necessarily intended to suggest any limitations as regards the present teachings. Generally, the system 100 includes one or more product inventory information distribution apparatus or systems (PIIDS) 102, which includes and/or is in communication with one or more central electronic data storage buffers 104; multiple product inventory storage facilities 106 (referred to for simplicity as retailers); one or more application services 108; multiple customer user interface units (UIU) 110 configured to allow customers to access at least the application services 108; and one or more distributed communication networks 112, which can provide wired and/or wireless communication. Some embodiments further include one or more databases 114. It is understood that more or fewer of such components may be included in different embodiments of the system 100.

The inventory information distribution system is configured to receive product inventory update information from the multiple retails and rapidly distribute that information to application services. Each of the retailers 106 is in communication with the product inventory information distribution system, or at least in communication with the storage buffer 104. In response to detecting a change in an inventory state corresponding to any one of multiple products, and typically hundreds or more products available through the retailer, the retailer generates and communicates a product inventory update information message. The product inventory update information messages identify at least the product for which the inventor state change has been detected and the type of change in inventory state. Typically, the inventory update information message also identifies the source or retailer communicating the message. The inventory update information message is directed to the buffer 104 that maintains each of the inventory update information messages for a buffer retention window or threshold of time. The inventory update information message is further streamed out or otherwise pushed out to each of one or more relevant applications services registered to receive relevant inventory update information messages.

In some embodiments, the data storage buffer is part of or directly coupled with the inventory information distribution system. In other embodiments, the data storage buffer may be distributed over a network (LAN, WAN, Internet, other such network or combination of such networks). Further, in some implementations, the buffer is duplicated one or more times by one or more buffers or buffer networks distributed over the communication network 112 providing redundancy and protection of the inventory update messages, and/or distributes the streaming to the application services so that a single buffer does not have to stream to all of the application services.

The product inventory storage facilities can be product sources with one or more "brick and mortar" shopping facilities, a chain of shopping facilities, catalog retailers, online retails, other such retailers, or product sources that utilize a combination of two or more of such retail methods. The application services 108 may additionally be product sources, may be associated with one or more of the product inventory storage facilities for which inventory information is obtained, may be a service that allows users to access product information about product inventory storage facilities, a service that interfaces between customers and one or more product inventory storage facilities, and other such application services. For example, in some embodiments, an application service can be an online service of a retailer that also has one or more physical shopping facilities. Again, it is often critical that these application services have as accurate as possible inventory information to provide customers with relevant information. For example, an application service may be notifying a customer that a particular shopping facility has one or more products of interest in stock. However, the customer will likely be very unhappy if the application service's inventory information for that particular shopping facility is inaccurate (e.g., stale, old, failed to receive updated information due to network connection problems, etc.), and the customer goes to the shopping facility to purchase the product of interest only to find out that the shopping facility does not actually have the product in stock.

In this illustrative example, the application services communicate with a plurality of user interface units 110. These teachings will accommodate a variety of user interface units including, but not limited to, computers and mobile and/or handheld electronic devices such as so-called smart phones and portable computers such as tablet/pad-styled computers, laptops, and the like. In some implementations, the user interface units are configured to wirelessly communicate with at least the application services via a wireless network or a combination of wireless and wired networks. The user interface units generally provide a user interface for interaction with the application services 108 and/or other components of the system 100.

In some embodiments, the user interface units 110 may be general purpose computer devices that include computer programming code to allow it to interact with the system 100. For example, such programming may be in the form of an application installed on the user interface unit or in the form of a browser that displays a user interface provided by the application service 108, a product inventory storage facility, or other remote computer or server (such as a web server). In some embodiments, one or more user interface units may be special purpose devices that are programmed to primarily function as a user interface for the system 100.

Some embodiments additionally include one or more databases 114 that may be accessible by the inventory information distribution system 102, the product inventory storage facilities, and/or application services. Such databases may be integrated into the inventory information distribution system or separate from it. Further, such databases may be at a location of the inventory information distribution system, a location of a product inventory storage facility, a location of an application service, remote from the inventory information distribution system, the product inventory storage facilities, the application services, or a combination thereof. Regardless of location, the databases comprise memory to store and organize certain data for use by one or more of the inventory information distribution system, product inventory storage facility, or application service. In some embodiments, the at least one database 114 may store data pertaining to one or more of: product inventory storage facility inventory information, application service inventory information from one or more product inventory storage facilities, customer information, application service information, and so on.

Figure 2:
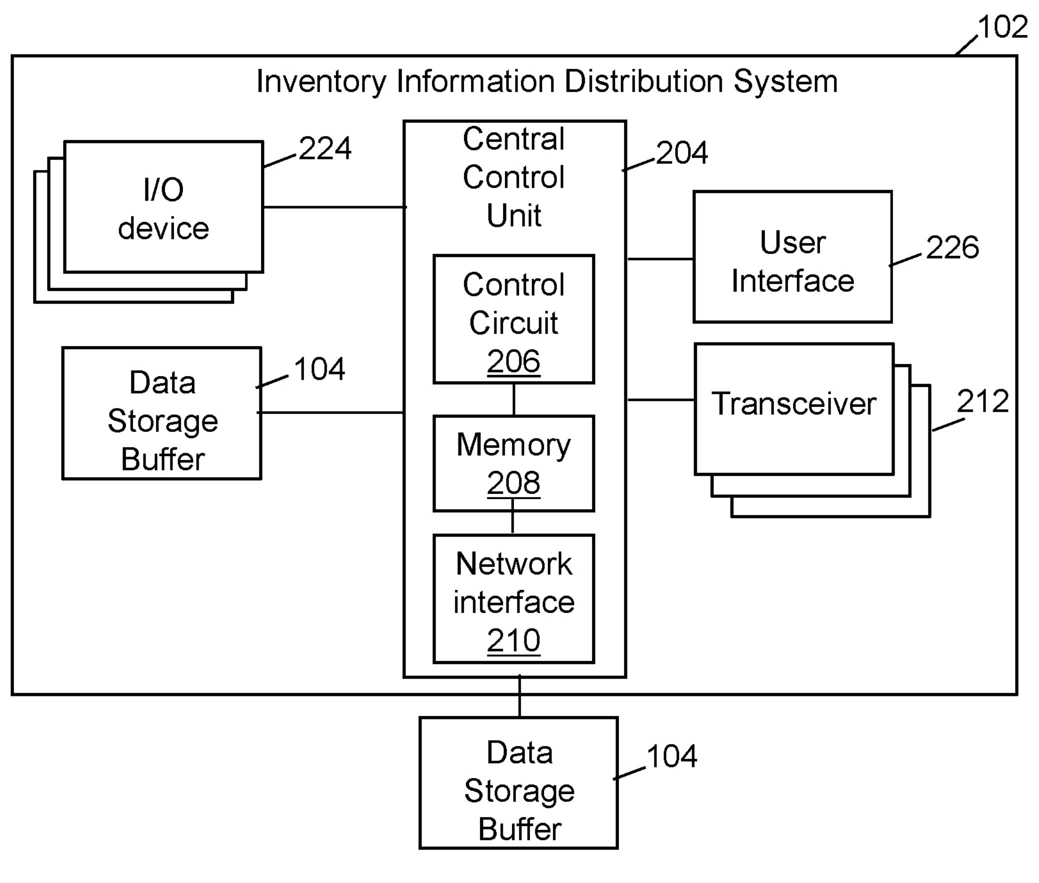
FIG. 2 presents a more detailed example of the inventory information distribution system, in accordance with some embodiments.

FIG. 2 presents a more detailed example of the inventory information distribution system 102, in accordance with some embodiments. In this example, the inventory information distribution system include a central control system or control unit 204 comprising a control circuit 206 that controls the general operations of the inventory information distribution system. Accordingly, the control unit 204 also includes a memory 208 coupled to the control circuit 206 and that stores, for example, operating instructions and/or useful data.

By one approach the control unit 204 is a processor and/or computer based system and includes at least one control circuit 206, at least one memory 208, and at least one wired and/or wireless network interface 210. Such a control circuit 206 can comprise a fixed-purpose hard-wired platform or can comprise a partially or wholly programmable platform, such as one or more microprocessors and/or microcontrollers, an application specification integrated circuit, a field programmable gate array, and so on. These architectural options are well known and understood in the art and require no further description here. This control circuit 206 is configured (for example, by using corresponding programming stored in the memory 208 as will be well understood by those skilled in the art) to carry out one or more of the steps, actions, and/or functions described herein.

In this illustrative example the control circuit 206 operably couples to one or more memories 208. The memory 208 may be integral to the control circuit 206 or can be physically discrete (in whole or in part) from the control circuit as desired. This memory can also be local with respect to the control circuit (where, for example, both share a common circuit board, chassis, power supply, and/or housing) or can be partially or wholly remote with respect to the control circuit (where, for example, the memory is physically located in another facility, metropolitan area, or even country as compared to the control circuit).

This memory 208 can serve, for example, to non-transitorily store the computer instructions that, when executed by the control circuit 206, cause the control circuit to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Generally, the memory 208 stores the operational code or set of instructions that is executed by the control circuit 206 and/or processor to implement the functionality of the inventory information distribution system 102. In some embodiments, the memory may also store some or all of particular data that may be needed obtain direct inventory update information messages, implement the streaming of inventory update information messages, make any of the determinations and/or corrections described herein, and the like. Such data may be pre-stored in the memory or be received, for example, from the databases, the user interface units, inventory systems, other sources, or combinations of such sources. It is understood that the control unit may be implemented as one or more processor devices as are well known in the art. Similarly, the memory may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory is shown as internal to the central computer system; however, the memory can be internal, external or a combination of internal and external memory.

The control circuit 206 operably couples to a data storage buffer 104. In some embodiments, the inventory update information messages are received and directed to the data storage buffer that temporarily stores and maintain the inventory update information messages in the data storage buffer received during a buffer retention window of time and/or maintains the each received product inventory update information message for a buffer retention window and/or threshold of time.

In some embodiments, the buffer 104 may be integral to the inventory information distribution system or can be physically discrete (in whole or in part) from the inventory information distribution system as desired. Further, the buffer can also be local with respect to the inventory information distribution system (where, for example, both share a common circuit board, chassis, power supply, and/or housing) or can be partially or wholly remote with respect to the inventory information distribution system (where, for example, the buffer is physically located in another facility, metropolitan area, or even country as compared to the inventory information distribution system). In some implementations, the data storage buffer operates in a first-in-first-out fashion sequentially receiving inventory update information messages, maintaining each inventory update information message for a corresponding retention window of time, and sequentially discarding the inventory update information messages in an order they were received following the expiration of the corresponding retention window of time. It is noted that different retention windows of time may be applied to different inventory update information messages (e.g., a designated or determined topic or category, based on a type of product, based the product inventory storage facilities communicating the message, or other such factors, or combinations of such factors).

In this illustrative example, the control circuit 206 also operably couples to at least one communication transceiver 212 that operates according to any known relevant communication protocol. Through the transceiver the control circuit can receive and transmit information and/or instructions. As one simple example in these regards, the control circuit 206 can direct inventory update information messages to the buffer 104.

In some embodiments, the inventory information distribution system includes an input/output (I/O) device 224 that is coupled to the control circuit 206. The I/O device 224 allows an external device to couple to the control unit 204. The function and purpose of connecting devices will depend on the application. In some examples, devices connecting to the I/O device 224 may add functionality to the control unit 204, allow the exporting of data from the control unit 204, allow the input of data, and so on.

In some embodiments, the inventory information distribution system 102 includes a user interface 226 including for example, user inputs and/or user outputs or displays depending on the intended interaction with the user. For example, user inputs could include any input device such as buttons, knobs, switches, touch sensitive surfaces or display screens, and so on. Example user outputs include lights, display screens, and so on.

It is noted that not all components illustrated in FIG. 2 are included in all embodiments of the inventory information distribution system 102. That is, some components may be optional depending on the implementation.

The product inventory storage facilities are configured to track and/or detect changes in inventory states and/or status. The changes can include substantially any change such as, but not limited to, a decrease in inventory (e.g., resulting from a sale, a product is thrown away (e.g., due to expiration, going bad, etc.), identify one or more products are stolen, in response to an audit, and other such changes), an increase in inventory (e.g., a product is returned, a shipment is received, in response to an audit, and other such changes), a change in price, and other such changes in inventory states. Further, these changes in inventory states can be detected and/or tracked for substantially any product, and often are detected for most if not substantially all products offered for sale and/or distribution by a product inventory storage facility.

In some implementations, the product inventory storage facilities include one or more inventory product inventory systems that are configured to detect, monitor for and/or track inventory state changes. The product inventory systems can be configured to communicate one or more inventory update information messages to the inventory information distribution system 102 and/or the data storage buffer 104 in response to detecting a change in inventory state. Further, the product inventory systems are typically configured to generate and communicate inventory update information messages immediately upon detecting the change in an inventory state. For example, the product inventory systems often communicate an inventory update information message within 2-5 seconds, and typically less than one second of detecting the change.

The product inventory systems can include or be in communication with units and/or systems of the product inventory storage facilities that can provide relevant information regarding changes in inventory states. For example, in some embodiments, the product inventory systems include or couple with one or more points of sales units (e.g., registers at a shopping facility, credit card confirmation systems of an online retailer, and other such points of sale units); one or more shipping and/or product ordering systems that receive confirmation when a product is delivered to the product inventory storage facilities; a user interface of the product inventory system and/or a graphical user interface application implemented on the product inventory system that allows a worker of the product inventory storage facilities to enter product information and/or update inventory states (e.g., indicating a throw-away, theft or the like, adjustments based on a product audit, etc.); and other such sources that can inform the product inventory system of the change in state.

The inventory update information message, in some embodiments, is a relatively simple message resulting in a relatively small amount of data that is communicated over the communication network 112. The message can be substantially any format that can convey the change in inventory state, such as but not limited to text, HTML, or other such formats. In some embodiments, the inventory update information message includes a limited amount of information to simplify the message, reduce network bandwidth usage, and/or reduce processing through the product inventory systems and application services. For example, in some instances, the inventory updated information message may include a product identifier (e.g., unique identifier, such as a numerical identifier corresponding to a bar code), and an indication of a change in state (e.g., increase or decrease). Typically, the inventory update information message further includes an identifier of the product inventory storage facilities where the change in inventory state occurred. In some embodiments, the inventory updated information additionally includes a time stamp of a time the change in state was detected and/or a time when the inventory update information message was transmitted.

Figure 3:
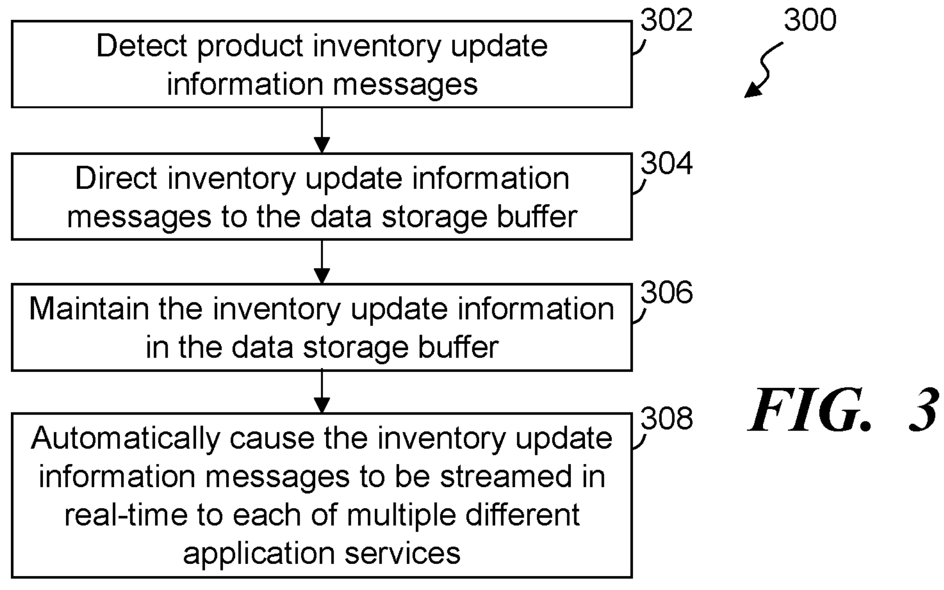
FIG. 3 illustrates a simplified flow diagram of an exemplary process of distributing product inventory information, in accordance with some embodiments.

FIG. 3 illustrates a simplified flow diagram of an exemplary process 300 of distributing product inventory information, in accordance with some embodiments. In step 302, the inventory information distribution system 102 detects and/or receives, over time, product inventory update information messages received over the communication network 112. The number of product inventory update information messages is dependent on the number of product inventory storage facilities 106 communicating the update information messages and the number of products available from the product inventory storage facilities. In some instances, for example, the number of product inventory update information messages can exceed a thousand an hour, and often can exceed tens of thousands an hour. Further, in some embodiments, the cooperation between the inventory information distribution system and the product inventory storage facilities is such that the product inventory storage facilities communicate the inventory update information messages without the inventory information distribution system requesting the product inventory update information messages. As introduced above, each of the product inventory update information messages is received from one of the multiple different product inventory systems of multiple different product inventory storage facilities, and is generated by a corresponding one of the multiple product inventory systems in response to one of the multiple product inventory systems detecting a change in an inventory state corresponding to any one of hundreds, or thousands or more products available through the product inventory storage facility.

In step 304, each of the multiple product inventory update information messages is directed to the central electronic data storage buffer 104. Again, the update information messages are typically relatively short messages including one or more relevant products identifiers for which the change in inventory was detected, the type of change or data type (e.g., change in price, inventory amount, an indication of a direction of change and a quantity of change, or other data type), and a shopping facility identifier (e.g., location ID) for which the change was detected. In some implementations, the inventory update information messages also include a time that the change in inventory was detected and/or a time the inventory updated information message was created (e.g., a universal time code). Additionally or alternatively, the storage buffer may add a time or time code corresponding to when the inventory update information message was received. For example, in some embodiments, the product inventory update information message comprises a product inventory storage facility identifier that uniquely identifies the product inventory storage facility from which a product inventory update information message is received, a product identifier that uniquely identifies a product for which the product inventory update information message corresponds, and a data type wherein the data type comprises at least one of: a change in a quantity of the product in inventory at the identified product inventory storage facility, and a change in pricing at the product inventory storage facility corresponding to the product.

In step 306, the inventory update information messages are maintained in the data storage buffer received during a buffer retention window of time and/or the information for each of the inventory update information messages is maintained in the storage buffer for a buffer retention window of time corresponding to the inventory update information message. That is, there may be different buffer retention windows of time, and different inventory update information messages may be categorized or associated with different "topics", and maintained for different buffer retention windows of time based on their corresponding categorization and/or topic. For example, different shopping facilities may be categorized by on a shopping facility format, and different shopping facility formats may have different buffer retention windows of time. In some implementations, the storage buffer may be partitioned with the different partitions being associated with one or more different topic or category. Additionally or alternatively, different storage buffers may be maintained for the different topics or categories, with different buffer retention windows of time being associated with different topics or categories.

In step 308, the control circuit is further configured to automatically cause, in response to buffering, each of the product inventory update information messages and/or the information from each of the inventory update information messages to be streamed or otherwise communicated in real-time from the data storage buffer over the distributed communication network to each of multiple different application services configured to receive the relevant inventory update information message. In some implementations, not all application services receive all inventory update information messages. Instead, the inventory update information messages may be categories and/or associated with a relevant topic, and application services can register with the inventory information distribution system 102 selecting one or more topics or categories for which the application service is to receive the inventory update information messages. The inventory update information messages are typically automatically streamed and without a polling request or other such request from the application services. As introduced above, the streaming of the inventory update information messages allows and/or causes each of the multiple different application services to sequentially update and compile inventory information, which allows the application services to effectively duplicate a current, real-time inventory state at each of the multiple product inventory storage facilities for each of one or more of the hundreds and likely thousands or more products available through each of the multiple product inventory storage facilities.

In some embodiments, the control circuit is further configured to maintain each of the product inventory update information messages and/or to cause each of the inventory update information messages to be maintained in the data storage buffer for the buffer retention window of time such that each of the inventory update information messages is available to be subsequently supplied to a requesting one or more of the multiple application services, for example, in response to a failure of the one or more of the multiple application services to receive one or more of the product inventory update information messages when attempted to be streamed. As introduced above, the inventory information distribution system 102 can be configured to receive inventory update information messages from hundreds or thousands or more shopping facilities each potentially carrying thousands to tens of thousands or more products. Accordingly, the number of inventory update information messages can exceed tens of thousands of inventory updated information messages an hour that are buffered and automatically and immediately streamed to application services. It is anticipated that communication failures will occur and application services will not receive one or more of the inventory update information messages. For example, a network connection may go down, an application service may temporarily go down (e.g., a failure, an upgrade, etc.), and other such failures of the application services to receive one or more of the inventory update information messages. Accordingly, the inventory information distribution system can be configured, in addition to automatically and immediately streaming the inventory update information messages, to receive requests from the application services to receive one or more inventory updated information messages that the application services missed or may have missed, such as during a communication failure (e.g., a network connection failure, a routing failure, a breakage of communication lines, etc.).

In some implementations, each of the multiple product inventory update information messages typically comprises a corresponding universal time code defining a time a product inventory system of the multiple product inventory systems detects the change in an inventory state to a corresponding product, a time when the inventory update information message is created, or transmitted. Additionally, in some instances, a universal time code defining a time when the inventory update information message is received at the buffer may be added. Further, the inventory update information messages define the change in the inventory state. Using the time codes, the application services can detect a likely failure to receive inventory update information messages and/or request inventory update information messages based on time codes. For example, an application service may regularly receive ten or more inventory update information messages a minute, and may detect that few than expected inventory update information messages are received. Similarly, an application service may detect a communication failure (e.g., due to an upgrade) for an identified period of time. As such, the application service can request from the inventory information distribution system all relevant inventory update information messages over a specified period of time. Using the time codes, the control circuit can identify the relevant inventory update information messages within the specified period of time and can cause those inventory update information messages within the specified time to be communicated to the requesting application service. The application service can utilize the previously unreceived inventory update information messages to correctly compile the inventory information to current, real-time inventory states.

For example, in some embodiments, control circuit receives a restore request from an application service of the multiple different application services in response to a detected communication failure at the application service. Again, the request typically specifies at least a start time corresponding to a time in the past for which the application service want to receive the inventory update information messages. The inventory information distribution system identifies, from the restore request, a starting read point time designating a past time from which product inventory update information messages that were buffered following that first starting read point time are being requested. The request may also designate an end time defining a window of time between the start and end times for which the application service is request the inventory update information messages. The inventory information distribution system, in response to the request, can cause a set of one or more previously buffered product inventory update information messages that were buffered following the specified starting read point time (and when relevant before a specified end read point time) to be communicated to the application service. Again, by providing the buffered inventory update information messages allows the application service to bring compiled inventory information compiled by the application service to current, real-time inventory states in response to a failure of the first application service to receive or accurately receive one or more of the product inventory update information messages when previously streamed.

Further, the inventory information distribution system is typically further configured to receive multiple requests for past inventory update information messages from multiple different application services, each specifying different start and/or end read point times. Accordingly, some embodiments are configured receive a second restore request from a second application service of the multiple different application services in response to a detected communication failure at the second application service. A second starting read point time (and in some instances, a second end read point time) can be identify from the second restore request, which is different than another read point time specified in a separate request for past inventory updated information messages. Again, the second starting read point time designates a past time from which product inventory update information messages that were buffered following that second starting read point time are being requested, and when present the second end read point time designates a point in time after which the buffered inventory update information messages are not being requested. The inventory information distribution system can, in response to the request, cause a set of one or more previously buffered product inventory update information messages that were buffered following the second starting read point time to be communicated to the second application service, allowing the second application service to bring compiled inventory information compiled by the second application service to the current, real-time inventory states in response to a failure of the second application service to receive one or more of the product inventory update information messages when previously streamed. As such, for example, when an application service has an outage the application service can resume reading from the buffer from a location of the last received inventory update information message. Further, each application service can initiate a restore using a different read point. Again, the inventory information distribution system is configured to continue to receive inventory update information messages that are buffered and immediately and automatically streamed to each of the relevant application services intended to receive the relevant inventory update information message, while also allowing application services to submit restore requests. By having a central buffer that allows each application service to have their own starting read point the inventory information distribution system handles both disruptions at the application service and the product inventory storage facilities 106. When older inventory update information messages are delivered before newer messages comparing the delivered versus the received time allows the application services from using invalid data.

As introduced above, not all inventory update information messages may be sent to each of the application services. Instead, some application services may be registered and/or otherwise associated with one or more of multiple topics or classifications, and inventory update information messages corresponding to those one or more registered topics or classifications are streamed to that application services. Additionally or alternatively, the application services can be implemented through multiple different servers. The servers may operate collectively, or one or more of the servers may operate independent of one or more other services. Typically, one or more controllers maintain controller of the collection of multiple servers operated by the application service. The multiple servers allow the application services to distribute the storage, provide backup and/or redundancy, reduce overhead, and the like. Further, an application service may designate one or more of the multiple servers to be exclusively associated one or more topics or categories of inventory update information messages. This allows these one or more servers to compile a duplicate inventory of one or more shopping facilities that are associated with the relevant one or more topics or categories.

In some embodiments, the inventory information distribution system is further configured to stream the inventory update information messages to relevant one or more servers of each of the application services. For example, a listing, table, database or the like may be maintained associating servers of application services to the sources of inventory update information messages, based on information within inventory update messages, types of inventory update information messages, or the like, or combinations thereof. In some implementations, the inventory information distribution system, for example through the control circuit, is further configured to apply a hashing to each of the product inventory update information messages that are received and buffered. One or more servers, of multiple servers operated by each of the multiple application services, can be identified based on the results of the hashing. For example, the control circuit may store in memory 208 a table of application services, corresponding one or more servers, and the one or more topics or categories registered or otherwise associated with the relevant servers. Accordingly, in some embodiments, the control circuit, for each of the product inventory update information messages and based on the results of the hashing, identifies one or more servers, of multiple servers operated by each of the multiple application services, intended to receive the product inventory update information message. Using this information, the inventory information distribution system can cause each of the product inventory update information messages to be streamed to the corresponding identified one or more servers intended to receive a respective product inventory update information message such that the product inventory update information messages are distributed amongst the multiple servers operated by each of the multiple application services.

Further, the streaming or otherwise distribution of the inventory update information messaged from the inventory information distribution system avoids having to receive requests from each application service for updated information. Again, the inventory at each of the product inventory storage facilities is expected to rapidly change, and in some instances, can dramatically change in very short periods of time (e.g., during peak holiday times). As such, the inventory data maintained and/or accessed by application services that periodically request inventory information is quickly inaccurate and inconsistent with actual inventory states. For example, in some instances, even a one minute delay may make drastic differences in inventory states. The use of databases to maintain inventory information typically requires requests to be received, process, locations of storage identified, data retrieved, and then forwarded to the requester. Such requesters typically would submit such requests on a schedule. As such, the information received is typically stale, at least by the time between requests, by the time the requester actually requests and receives the information and can utilize the information.

Accordingly, by allowing the product inventory storage facilities to immediately communicate a change in inventory state, through the communication of a relatively simple and small data message, that is buffered and automatically streamed to application services, the application services can locally maintain real-time inventory states that substantially mirror, and typically exactly mirrors, actual inventory states at hundreds or even tens of thousands or more product inventory storage facilities. This allows that application services to effectively provide customers with inventory states that are accurate and consistent with what the product inventory storage facilities believe are their current inventory states.

Further, some embodiments provide real time on-hand inventory and pricing information for hundreds or thousands or more product inventory storage facilities. The application services can utilize the accurate, real-time information provide a wide variety of information to customers, product inventory storage facilities, and others. For example, the application services can be configured to utilized the compiled inventory information to show visually store merchandise real time inventory and pricing at a shopping facility, across a chain of shopping facilities, a region, a market, a state, a country, and the like; show trends for on-hand verses in-transit items at a shopping facility, across a chain of shopping facilities, a region, a market, a state, a country, and the like; show visually number of shopping facilities across a chain unable to sell one or more particular products in last few minutes, hours, days, which may be beneficial in situations (e.g., helpful for tracking thanksgiving non-hot selling items); readily identify hot selling items or top 10 items sold in one or more designated time intervals; identify a most fluctuated items in inventory at a shopping facility, across a chain of shopping facilities, a region, a market, a state, a country, and the like; product identifier (e.g., UPCs) comparison and/or comparative sales on related products; aggregation average, max and min per shopping facility, across a chain of shopping facilities, a region, a market, a state, a country, and the like availability; show a customer most real-time inventory to improve on the sales; identify products at a store located near a customer; show graphically data, such as by means of heat maps or bubble charts to monitor continuous updates on inventory across the chain, which may in some instances be further drilled to show the inventory visually by market, region, states, etc.; and other such uses.

As described above, often the producers of inventory information (e.g., product inventory storage facilities 106) and the consumers of inventory information (e.g., application services 108) are very unstable. For example, many if not all application services that want to use inventory and/or pricing information (e.g., to show customers relevant inventory information) can go off line for indeterminate amounts of time and at indeterminate times. Similarly, the producers of the inventory and/or pricing information can go off line for indeterminate amounts of time and at indeterminate times. As such, application services and/or other consumers of inventory information often need to be brought back to a current state. Further, inventory information for multiple product inventory storage facilities can often result in large amounts of data, and with large product inventory storage facilities offering thousands or more products with tens, or hundreds or more inventory changes occurring every second. Because inventory data is so large, the use of a database would require inventory information consumers or "clients" to "pull" data from the database. The number of requests would likely be so huge it would crash the database system and/or the client system (too much data trying to be sent to too many clients).

Some present embodiments, however, utilize relatively small inventory update information messages. Further, these inventory update information messages are temporarily buffered utilizing the central electronic data storage buffer over a buffer retention window of time and further automatically and substantially instantaneously streams in response to detecting and/or buffering the inventory update information messages to the application servers and/or other consumers of inventory information. Additionally, some embodiments provide a stateless process in the buffering and streaming the inventory update information messages. The product inventory storage facilities push data to the buffer, conveying information that inventory has changed. In some embodiments, the product inventory storage facilities do not have to accumulate, keep track of, audit, verify, or any other processing or use of the inventory update information. Instead, the product inventory storage facilities can be configured to detect a change in inventory status, and initiate a push of an inventory update information message.

The inventory information distribution system and/or buffers continuously push the relevant inventory update information messages and/or the relevant portions of information from the inventory update information messages to the relevant application services that have requested and/or care that inventory information has changed. Further, the inventory information distribution system typically does not have to inventory the inventory update information messages, and/or does not have to try to make the system operate quickly. Instead, the buffering and the automatic streaming of the inventory update information messages provides an inherently quick system in that the product inventory storage facilities send information upon detection of a change in inventory and/or pricing data, and that data is immediately pushed to the application services. Further, the inventory update information messages do not have to be utilized by the inventory information distribution system, and instead, the application services that receive the relevant information of the inventory update information messages process the data and use the data for their respective desired use.

Further, in some embodiments, the buffer typically does not meet the characteristics of a database in that, in part, the buffer does not support arbitrary retrievals (e.g., retrieval of specific information for a specific product and/or for a specific shopping facility). The application services do not have to poll the inventory distribution system or pull messages. The streaming or otherwise automatic distribution of the inventory update information messages provides more current and up-to-date information, allowing the application services to maintain real-time, up-to-date inventory information, which in some instances is substantially identical (e.g., typically less than tens of seconds delay, and often less than 2 seconds delay) to the inventory information that of the product inventory storage facilities. When a change in an inventory state is detected it is immediate pushed out, and the application services do not have to wait for a scheduled polling, or other delay in requesting data.

Some embodiments allow the application services to request data from a given point in time; however, specific requests are typically not supported. Accordingly, in some embodiments, the inventory information distribution system and buffer provide application services with recovery. When something happens that interferes with the application services tracking the inventory information, the buffer can be accessed and back-time information can be acquired, allowing the application services to quickly evaluate and update relevant changes made to quickly bring the application services inventory information up to date and current in real time. The application services (or other user of the inventory information) are responsible for the use the inventory data provided over time, typically is responsible for determining inventory based on inventory update information provided over time. Further, the application services build inventory data by tracking updates over time. The timing information allows the application services to accurately adjust the inventory data. The application services can use the inventory update information for substantially any relevant purpose. For example, an application service may want to reconstruct and/or maintain a copy of a current inventory that a specific store has and/or the replicate one or more stores inventory database; identify inventory data relevant to the store of interest; make appropriate updates over time; generate mappings; provide customers with relevant information, and the like.

In some embodiments, the application services utilize multiple servers to maintain and track inventory information. Accordingly, the application services determine the computational functionality that is to be performed and/or how the inventory information is to be utilized. When multiple servers are to be utilized, the application services can determine each server's processing capabilities. Utilizing this information, the application services can direct inventory update information to relevant servers and/or can register with the inventory information distribution system so that the inventory information distribution system in streaming the inventory update information messages directs the messages to appropriate servers. As such, each of the multiple servers of an application service receives a partitioned portion ("slice") of the inventory update information. The application services identify an amount of data capable of being processed by each server and define a partition responsibility of each server. In some embodiments each server identifies messages corresponding to the partition with which it is responsible.

Further, when a server or application service wants to restore the inventory information due, for example, to a temporary interrupt the application service identifies a corresponding starting time stamp. A restore request is transmitted to the inventory information distribution system identifying the starting time stamp. In some embodiments, each sever identifies the partition it is interested in and the time stamp). The inventory information distribution system transmits the relevant information messages to be received by the relevant servers. Each server, in some implementations, identifies messages corresponding to responsible partition, and identifies accurate sequencing of information corresponding to the starting time stamp and subsequent time stamps. The servers process the information, and typically sequentially process the information in accordance with the sequential time stamps to initiate and/or update relevant inventory information. The amount of time needed by application service to process information is again based on the number of servers and each server's capabilities to process the information. Again, new current messages continue to be pushed out by the inventory information distribution system, and the relevant servers continue to obtain and update the locally determined inventory information. Accordingly, some embodiments, in part include the central buffer that buffers the inventory update information messages and streams the inventory updated information messages to application services to allow the application services to track and recreate in real time an inventory database and substantially mirrors inventory database information at multiple product inventory storage facilities.

In some embodiments, apparatuses and methods are provided herein useful to distributing inventory information. In some embodiments, a product inventory information distribution apparatus, comprises: a central electronic data storage buffer; a control circuit coupled with the central electronic data storage buffer; and a memory coupled to the control circuit and storing computer instructions that when executed by the control circuit cause the control circuit to: detect, over time, product inventory update information messages received over a distributed communication network without requesting the product inventory update information messages, wherein each of the product inventory update information messages is received from one of multiple different product inventory systems of multiple different product inventory storage facilities, and wherein each of the product inventory update information messages is generated by a corresponding one of the multiple product inventory systems when one of the multiple product inventory systems detects a change in an inventory state corresponding to any one of hundreds or more products available through the product inventory storage facility; direct each of the multiple product inventory update information messages to the central electronic data storage buffer; and maintain messages in the central electronic data storage buffer received during a buffer retention window of time.

In some embodiments, a method of distributing inventory information, comprises: by a control circuit of an inventory information distribution system: detecting, over time, product inventory update information messages received over a distributed communication network without requesting the product inventory update information messages, wherein each of the product inventory update information messages is received from one of multiple different product inventory systems of multiple different product inventory storage facilities, and wherein each of the product inventory update information messages is generated by a corresponding one of the multiple product inventory systems when one of the multiple product inventory systems detects a change in an inventory state corresponding to any one of hundreds or more products available through the product inventory storage facility; directing each of the multiple product inventory update information messages to the central electronic data storage buffer; maintaining messages in the central electronic data storage buffer received during a buffer retention window of time; and automatically causing, in response to buffering, each of the product inventory update information messages to be streamed from the central electronic data storage buffer over the distributed communication network to each of multiple different application services.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A product inventory information distribution system, comprising:

a central electronic data storage buffer comprising multiple memory each communicatively coupled with a distributed communication network;

a control circuit communicatively coupled over the distributed communication network with the central electronic data storage buffer and with each of multiple different product inventory systems; and a memory coupled to the control circuit and storing computer instructions that when executed by the control circuit cause the control circuit to:

receive, over time, product inventory update information messages received over the distributed communication network without requesting the product inventory update information messages, wherein each of the product inventory update information messages is received from one of the multiple different product inventory systems corresponding to one of multiple different product inventory storage facilities based on a detected change in an inventory corresponding to any one of numerous products available through the corresponding product inventory storage facility;

communicate, in real time and in response to receiving the product inventory update information, over the distributed communication network each of the product inventory update information messages to the central electronic data storage buffer;

control the central electronic data storage buffer to maintain at least a portion of the product inventory update information messages in the central electronic data storage buffer for a respective buffer retention window of time;

automatically control the central electronic data storage buffer to cause, in response to buffering, each of the product inventory update information messages to be streamed from the central electronic data storage buffer over the distributed communication network to each of multiple different application services without requests from the multiple different application services, wherein each of the multiple application services comprises multiple servers communicatively coupled with the distributed communication network; and partition each of the multiple application services as a function of processing capabilities of the respective multiple servers of the respective application service and according to an associated category of different categories, wherein each server, of the multiple servers, corresponds to a different partition and is associated with one of the different categories;

wherein each application service, of the multiple application services, is to direct the respective product inventory update information messages to the different partitioned servers according to the associated category, of the different categories, with which each of the inventory update information messages corresponds.

2. The system of claim 1, wherein the control circuit is further configured to:

receive a first restore request from a first application service of the multiple different application services;

identify, from the first restore request, a first starting read point time designating a past time from which product inventory update information messages are being requested; and cause a first set of one or more previously buffered product inventory update information messages that were buffered following the first starting read point time to be communicated to the first application service.

3. The system of claim 1, wherein each of the product inventory update information messages comprises a corresponding universal time code defining a time of the respective change in an inventory to a corresponding product, and defines the respective change in the inventory.

4. The system of claim 1, wherein the control circuit is further configured to maintain each of the product inventory update information messages in the central electronic data storage buffer for the respective buffer retention window of time such that each of the product inventory update information messages is available, during the respective buffer retention window, to be subsequently supplied to a requesting one or more of the multiple application services in response to a failure of the one or more of the multiple application services to receive one or more of the product inventory update information messages when attempted to be streamed.

5. The system of claim 1, wherein a first product inventory update information message of the product inventory update information messages is assigned a first buffer retention window of time, and a second product inventory update information message of the product inventory update information messages is assigned a second buffer retention window of time that has a different time duration than the first buffer retention window of time.

6. The system of claim 1, wherein the control circuit is further configured to:

receive a first restore request from a first application service of the multiple different application services;

identify, from the first restore request, a first starting read point time designating a past time from which product inventory update information messages are being requested; and cause a first set of one or more previously buffered product inventory update information messages that were buffered following the first starting read point time to be communicated to the first application service;

receive a second restore request from a second application service of the multiple different application services;

identify, from the second restore request, a second starting read point time different than the first starting read point time; and cause a second set of each previously buffered product inventory update information message that was buffered following the second starting read point time to be communicated to the second application service.

7. The system of claim 1, wherein at least some of the product inventory update information messages each comprises a product inventory storage facility identifier that uniquely identifies a first product inventory storage facility, of the multiple different product inventory storage facilities, from which a product inventory update information message is received, and a product identifier that uniquely identifies a product for which the product inventory update information message corresponds.

8. The system of claim 7, wherein each of the at least some of the product inventory update information messages further comprises a data type wherein the data type comprises at least one of: a change in a quantity of the product in inventory at the identified first product inventory storage facility, and a change in pricing at the first product inventory storage facility corresponding to the product.

9. The system of claim 1, wherein the control circuit is further configured to:

receive a first restore request from a first application service of the multiple different application services;

identify, from the first restore request, a first starting read point time designating a past time from which product inventory update information messages are being requested; and cause a first set of one or more previously buffered product inventory update information messages that were buffered following the first starting read point time to be communicated to the first application service;

identify, from the first restore request, a first end time designating a time after the first starting read point time defining a window of time between the first starting read point time and the first end time for which the first application service is requesting the inventory update information messages; and wherein the causing the first set of the one or more previously buffered product inventory update information messages to be communicated to the first application service comprises cause the first set of the one or more previously buffered product inventory update information messages comprising each previously buffered product inventory update information messages received within the defined window of time between the first starting read point time and the first end time and cause the first application service to bring compiled inventory information compiled by the first application service to current, real-time inventory states.

10. The system of claim 1, wherein the control circuit is further configured to maintain associations between the multiple different application services and relative to sources of inventory update information messages;

receive a first product inventory update information message, and identify a type of inventory update information message of the first product inventory update information message based on information within the product inventory update information messages;

identify, based on the type of inventory update information message and the associations maintained, a set of one or more application services of the multiple different application services to receive the first product inventory update information message; and cause the first product inventory update information message to be communicated to the set of one or more application services such that less than all of the multiple different application services receives the first product inventory update information message to cause the set of one or more application services to duplicate a current, real-time inventory state corresponding to the first product inventory update information message at each of the set of one or more application services.

11. The system of claim 1, comprising the multiple different application services wherein two or more of the multiple different application services comprise multiple application servers each configured to identify a subset of the product inventory update information messages corresponding to a partition of the inventory information for which the respective application server is responsible and update inventory information based on the respective subset of the product inventory update information messages.

12. A method of distributing inventory information, comprising:

by a control circuit of an inventory information distribution system:

receiving, over time, product inventory update information messages received over a distributed communication network without requesting the product inventory update information messages, wherein each of the product inventory update information messages is received from one of multiple different product inventory systems of multiple different product inventory storage facilities based on a detected change in an inventory corresponding to any one of numerous products available through a respective one of the product inventory storage facilities;

communicating at least a portion of each of the product inventory update information messages to a central electronic data storage buffer;

maintaining at least the portion of each of the product inventory update information messages in the central electronic data storage buffer for a respective buffer retention window of time;

automatically controlling the central electronic data storage buffer and causing, in response to buffering, a streaming of each of the product inventory update information messages from the central electronic data storage buffer over the distributed communication network to each of multiple different application services without requests from the multiple different application services, wherein each of the multiple application services comprises multiple servers communicatively coupled with the distributed communication network;

partitioning each of the multiple application services as a function of processing capabilities of the respective multiple servers of the respective application service and according to an associated category of different categories, wherein each server, of the multiple servers. corresponds to a different partition and is associated with one of the different categories; and wherein each application service directs the product inventory update information messages to the different partitioned servers of the multiple application services according to the associated category of the different categories with which each of the inventory update information messages corresponds.

13. The method of claim 12, wherein each of the product inventory update information messages comprises a corresponding universal time code defining a time of the respective change in an inventory to a corresponding product, and defining the respective change in the inventory.

14. The method of claim 12, further comprising:

maintaining each of the product inventory update information messages in the central electronic data storage buffer for the respective buffer retention window of time such that each of the product inventory update information messages is available, during the respective buffer retention window, to be subsequently supplied to a requesting one or more of the multiple application services in response to a failure of the one or more of the multiple application services to receive one or more of the product inventory update information messages when attempted to be streamed.

15. The method of claim 12, wherein a first product inventory update information message of the product inventory update information messages is assigned a first buffer retention window of time, and a second product inventory update information message of the product inventory update information messages is assigned a second buffer retention window of time that has a different time duration than the first buffer retention window of time.

16. The method of claim 12, further comprising:

receiving a first restore request from a first application service of the multiple different application services;

identifying, from the first restore request, a first starting read point time designating a past time from which product inventory update information messages are being requested; and causing a first set of one or more previously buffered product inventory update information messages that were buffered following the first starting read point time to be communicated to the first application service;

receiving a second restore request from a second application service of the multiple different application services;

identifying, from the second restore request, a second starting read point time different than the first starting read point time; and causing a second set of each previously buffered product inventory update information message that was buffered following the second starting read point time to be communicated to the second application service.

17. The method of claim 12, wherein at least some of the product inventory update information messages each comprises a product inventory storage facility identifier that uniquely identifies a first product inventory storage facility, of the multiple different product inventory storage facilities, from which a product inventory update information message is received, and a product identifier that uniquely identifies a product for which the product inventory update information message corresponds.

18. The method of claim 12, further comprising:

receiving a first restore request from a first application service of the multiple different application services;

identifying, from the first restore request, a first starting read point time designating a past time from which product inventory update information messages are being requested; and causing a first set of one or more previously buffered product inventory update information messages that were buffered following the first starting read point time to be communicated to the first application service;

identifying, from the first restore request, a first end time designating a time after the first starting read point time defining a window of time between the first starting read point time and the first end time for which the first application service is requesting the inventory update information messages; and wherein the causing the first set of the one or more previously buffered product inventory update information messages to be communicated to the first application service comprises causing the first set of the one or more previously buffered product inventory update information messages comprising each previously buffered product inventory update information messages received within the defined window of time between the first starting read point time and the first end time and causing the first application service to bring compiled inventory information compiled by the first application service to current, real-time inventory states.

19. The method of claim 12, further comprising:

maintaining associations between the multiple different application services and relative to sources of inventory update information messages;

receiving a first product inventory update information message, and identify a type of inventory update information message of the first product inventory update information message based on information within inventory update messages;

identifying, based on the type of inventory update information message and the associations maintained, a set of one or more application services of the multiple different application services to receive the first product inventory update information message; and causing the first product inventory update information message to be communicated to the set of one or more application services such that less than all of the multiple different application services receives the first product inventory update information message to cause the set of one or more application services to duplicate a current, real-time inventory state corresponding to the first product inventory update information message at each of the set of one or more application services.

20. A non-transitory machine readable medium storing instructions that, when executed, cause a processing resource to:

receive, over time, product inventory update information messages received over a distributed communication network without requesting the product inventory update information messages, wherein each of the product inventory update information messages is received from one of multiple different product inventory systems of multiple different product inventory storage facilities based on a detected change in an inventory corresponding to any one of numerous products available through a respective one of the product inventory storage facilities;

communicate at least a portion of each of the product inventory update information messages to a central electronic data storage buffer;

maintain at least the portion of each of the product inventory update information messages in the central electronic data storage buffer for a respective buffer retention window of time;

automatically control the central electronic data storage buffer and cause, in response to buffering, a streaming of each of the product inventory update information messages from the central electronic data storage buffer over the distributed communication network to each of multiple different application services without requests from the multiple different application services, wherein each of the multiple application services comprises multiple servers communicatively coupled with the distributed communication network; and partition each of the multiple application services as a function of processing capabilities of the respective multiple servers of the respective application service and according to an associated category of different categories, wherein each server, of the multiple servers, corresponds to a different partition and is associated with one of the different categories;

wherein each application service directs the product inventory update information messages to the different partitioned servers of the multiple application services according to the associated category of the different categories with which each of the inventory update information messages corresponds.

* * * * *